Figure 1:
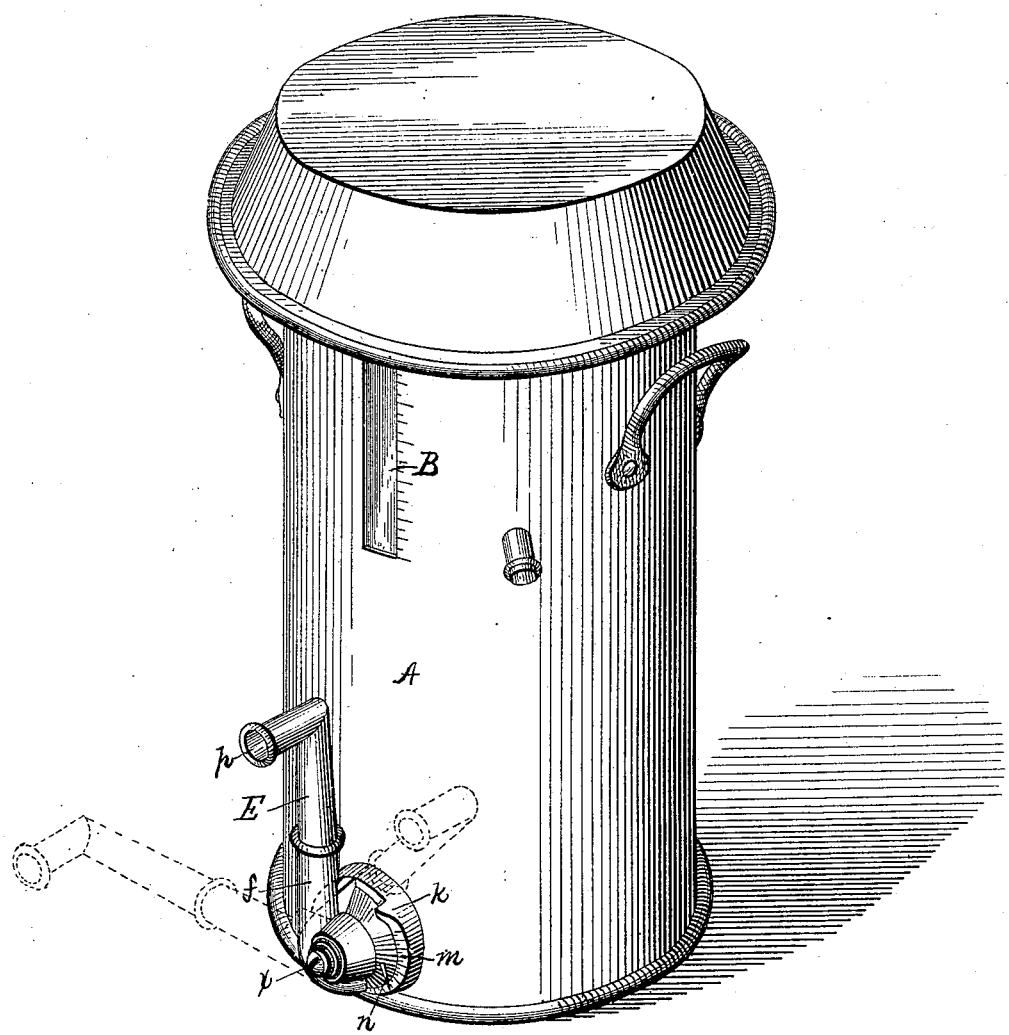

(No Model.) 2 Sheets—Sheet 1.

F. G. BUTLER.
PROCESS OF SEPARATING CREAM FROM MILK.

No. 253,155. Patented Jan. 31, 1882.

Witnesses:
A. H. Betz.
G. L. Johnson.

Inventor:
Francis G. Butler
by John J. Halsted & Son
Attys.

(No Model.) 2 Sheets—Sheet 2.
F. G. BUTLER.
PROCESS OF SEPARATING CREAM FROM MILK.
No. 253,155. Patented Jan. 31, 1882.
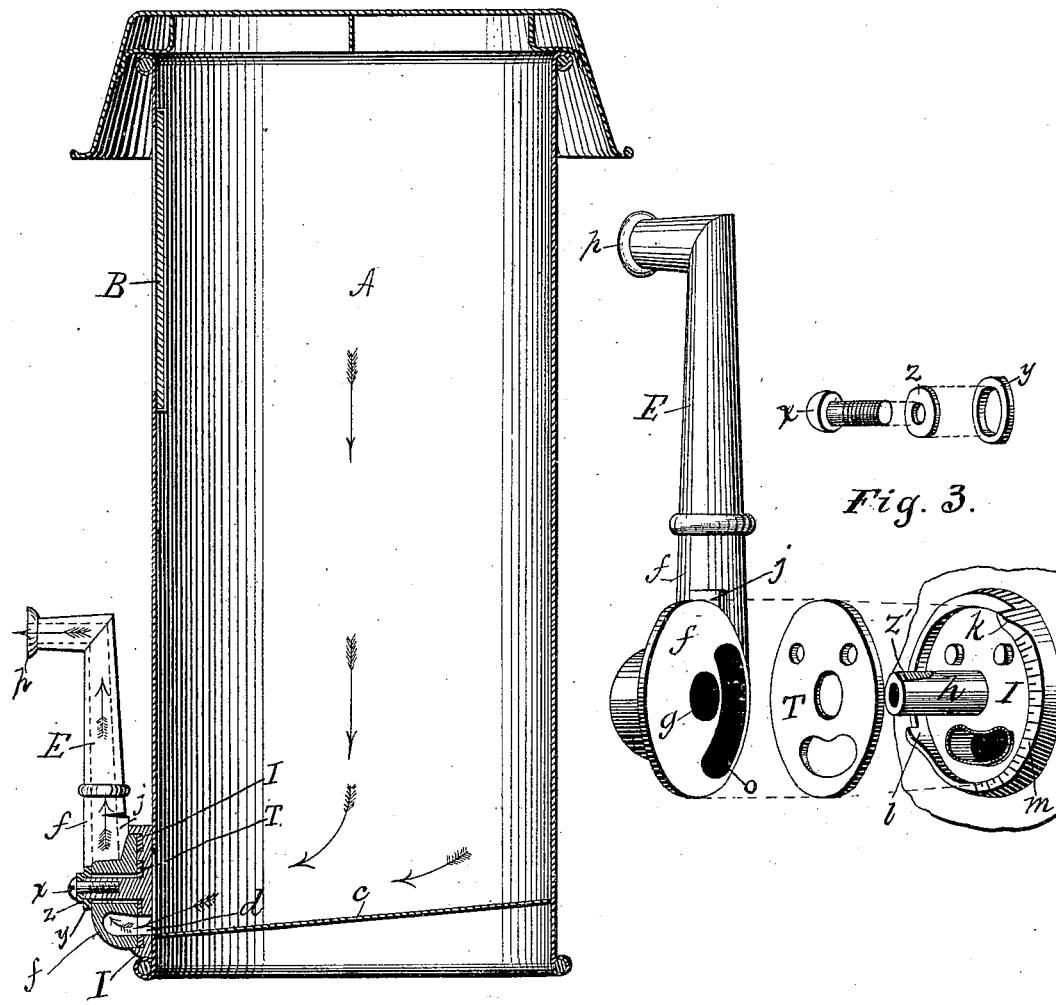
Witnesses:
A. H. Betz
G. L. Johnson
Inventor.
Francis G. Butler
by John J. Halsted & Son
Attys.

UNITED STATES PATENT OFFICE.

FRANCIS G. BUTLER, OF WEST HARTFORD, CONNECTICUT, ASSIGNOR TO THE VERMONT FARM MACHINE COMPANY, OF BELLOWS FALLS, VT.

PROCESS OF SEPARATING CREAM FROM MILK.

SPECIFICATION forming part of Letters Patent No. 253,155, dated January 31, 1882.

Application filed November 8, 1881. (No model.)

*To all whom it may concern:*

Be it known that I, FRANCIS G. BUTLER, formerly of Bellows Falls, Vermont, but now of West Hartford, in the county of Hartford and State of Connecticut, have invented a certain new and useful Improvement in the Art or Method of Separating Cream from Milk; and I do hereby declare that the following is a full, clear, and exact description of the invention, which will enable others skilled in the art to which it appertains to make and use the same, reference being had to the accompanying drawings, and to letters of reference marked thereon, which form a part of this specification.

My invention consists in a novel method of separating cream from the milk from which or upon which it shall have been raised by first ascertaining the quantity or depth of cream raised in the milk-containing vessel, then withdrawing the milk from beneath the cream and leaving such predetermined quantity of cream within the vessel.

Figure 1 is a perspective view; Fig. 2, a vertical section, and Fig. 3 details of an apparatus adapted for practicing my invention.

A represents any ordinary can, or it may be a pail or other vessel or vat for holding milk, and near its top it is provided with a pane or panel, B, of glass or other transparent material, and of sufficient length vertically to show to an observer the height of the cream which may be raised upon the milk in the vessel.

A scale in inches and divisions of inches may, if desired, be made upon the vessel or glass, as shown in Fig. 1, to indicate the height of the raised cream. The glass may be used, however, without any scale.

The object of indicating the height or quantity of cream before it is drawn off has relation to the means next to be described for afterward drawing it off either from the bottom of the vessel or, if desired, from above the milk, and in this respect it differs from the object and function of the pane described in my Patent No. 194,510, and which could only show the height of the cream after all the milk had been drawn off from beneath it.

The bottom of the vessel is preferably made slanting toward its outlet-orifice, as shown at $c$ in Fig. 2, this orifice $d$ being at the lowest part of the bottom, so as to affect a full discharge of the contents when desired.

E is a discharging valve-tube or faucet connected to or made continuous with the valve-piece $f$, this latter, by means of its center hole, $g$, being adapted to turn on a center pin or arbor, $h$, fixed on the vessel or on a cap piece or plate, I, as shown. The valve and its tube E are vibratory on the arbor, and the valve-piece has a projection or stop, $j$, and the plate I or the vessel has stops $k$ $l$ to limit or arrest the vibratory movements or swinging in either direction when the stop comes in contact either with $k$ or $l$, respectively. The piece I has a graduated scale, $m$, and the valve-piece $f$ carries a pointer or index, $n$, and these serve to determine the position or degree to which the faucet should be adjusted relatively to the quantity of cream raised, in order to cause the delivery through this faucet to cease when the milk shall have been discharged, and then leave the cream in the bottom of the vessel. The inlet-opening $o$ of the valve-piece $f$ is longer than its breadth, and made in the arc of a circle of which the arbor is the center, and its position and its length are such relatively to the stationary orifice $d$ that when the faucet E is out of operative position for discharging, or when it is upright, the valve-inlet $o$ is closed; but when in any position adapted for discharging the communication of $o$ with $d$ will be open more or less, according to the position of the swinging tube. The valve-piece $f$ and its tube are affixed and held to place by means of a screw, $x$, and appropriate washers $y$ $z$, and the arbor is preferably a little flattened at one side, as shown at $z'$, to prevent the washer $y$, which has a correspondingly-shaped opening, from turning when the tube is turned on its axis.

T is a leather or flexible packing interposed between the plate I and the valve-piece $f$.

The operation is as follows: The vessel having been supplied with milk and the cream having been raised thereon, say, to the depth of four inches, as indicated by or through the glass B, the discharge tube or pipe E is next turned or swung upon its center or arbor $h$, so as to adjust its discharging-mouth $p$ at the same height or indication of four inches above the average bottom line or level of the vessel.

This movement also opens the valve, and the can or vessel will now automatically discharge all the milk which is below the cream and leave the cream in the vessel, say, four inches in depth. A further turning of the pipe on its arbor (which should be held tight enough by its center screw to maintain any position to which it may be set) will permit the subsequent discharge of any desired portion or all of the cream, and this should be discharged into another receptacle.

The opening $d$ into the faucet, being on the side of the bottom of the can, prevents any commotion or whirlpool while discharging, and the line between the cream and the milk descends unbroken even though the faucet be wide open.

The slanting bottom not only lets the contents out easier, but makes a better separation of the milk from the cream than if the bottom were level.

The can or vessel A is shown with a raised cover, and such that the contents of the vessel may be water-sealed when the vessel is placed sufficiently deep in water; but I do not in this application make any claim to the cover, nor to a milk-setting vessel adapted for raising cream by sealing in water, having an overhanging cover and internal supports for raising the cover slightly above the vessel, as this forms the subject-matter of an independent application heretofore filed by me in the United States Patent Office.

I claim—

The within-described method of separating cream from the milk from or upon which it shall have been raised, which consists in first ascertaining, as set forth, the quantity or depth of cream raised in the vessel, and then adjusting a discharge-faucet to the desired point and withdrawing the milk from beneath the cream, leaving such predetermined quantity of cream within the vessel.

FRANCIS G. BUTLER.

Witnesses:
CHAS. L. BURDETT,
L. H. GAGER.